US007998233B2

(12) United States Patent
Maeda et al.

(10) Patent No.: US 7,998,233 B2
(45) Date of Patent: Aug. 16, 2011

(54) AIR CLEANER UNIT FOR VEHICLE AND FAN SHROUD HAVING THE SAME

(75) Inventors: Akihiro Maeda, Kariya (JP); Shinichi Oda, Okazaki (JP); Atsushi Hirota, Kuwana (JP)

(73) Assignee: Denso Corporation, Kariya (JP)

( * ) Notice: Subject to any disclaimer, the term of this patent is extended or adjusted under 35 U.S.C. 154(b) by 365 days.

(21) Appl. No.: 12/313,164

(22) Filed: Nov. 18, 2008

(65) Prior Publication Data

US 2009/0133663 A1 May 28, 2009

(30) Foreign Application Priority Data

Nov. 26, 2007 (JP) ................................ 2007-304850

(51) Int. Cl.
*E04F 17/04* (2006.01)
*F04D 29/54* (2006.01)
*H02K 5/10* (2006.01)
*H02K 5/12* (2006.01)

(52) U.S. Cl. ................................ 55/385.3; 123/198 E

(58) Field of Classification Search ................. 55/385.3; 123/41.7, 41.49, 198 E; 180/68.1; 181/224; 415/119, 211.1, 208.1, 223; 416/169 A, 416/189

See application file for complete search history.

(56) References Cited

U.S. PATENT DOCUMENTS 5,427,502 A * 6/1995 Hudson ...................... 415/211.1
6,041,744 A 3/2000 Oota et al.
6,499,956 B2 * 12/2002 Nakamura .................... 416/189
6,938,727 B2 * 9/2005 Xia .............................. 181/224
7,132,772 B2 * 11/2006 Takeuchi et al. ................ 310/88
2001/0018022 A1 * 8/2001 Nakamura .................... 415/203
2003/0221905 A1 * 12/2003 Xia .............................. 181/224
2006/0266309 A1 * 11/2006 Lang et al. ................. 123/41.49
2008/0289796 A1 * 11/2008 Sasano et al. ................... 165/51
2008/0314357 A1 * 12/2008 Sasano et al. ............. 123/198 E
2009/0145577 A1 * 6/2009 Shuttleworth et al. .......... 165/47
2009/0152902 A1 * 6/2009 Sugasaki et al. ......... 296/203.02
2010/0050980 A1 * 3/2010 Sasano et al. ............. 123/198 E
2010/0071978 A1 * 3/2010 Kisse .......................... 180/68.2
2010/0206526 A1 * 8/2010 Yabe et al. .................... 165/121
2010/0275862 A1 * 11/2010 Cassell et al. .............. 123/41.57

FOREIGN PATENT DOCUMENTS

JP 60-33326 10/1985

(Continued)

OTHER PUBLICATIONS

Reason of Rejection dated Apr. 6, 2010 in corresponding JP Application No. 2007-304850.
Office Action dated Aug. 25, 2009 in corresponding JP Application No. 2007-304850.

*Primary Examiner* — Duane Smith
*Assistant Examiner* — Minh-Chau Pham
(74) *Attorney, Agent, or Firm* — Harness, Dickey & Pierce, PLC

(57) ABSTRACT

An air cleaner unit for a vehicle includes an air cleaner element and an air cleaner housing to be arranged generally above ring portions of a fan shroud. The air cleaner element is disposed in the air cleaner housing such that a predetermined space is provided between a lower surface of the air cleaner element and an inner surface of a bottom wall of the air cleaner housing. The bottom wall of the air cleaner housing includes at least two arcuate portions to correspond to the ring portions of the fan shroud and a projecting portion between the arcuate portions. The projecting portion projects downwardly and is configured to increase the volume of the predetermined space.

23 Claims, 11 Drawing Sheets

FOREIGN PATENT DOCUMENTS

| | | |
|---|---|---|
| JP | U-63-14428 | 1/1988 |
| JP | 2-76158 | 6/1990 |
| JP | 11-072021 | 3/1999 |
| JP | 11-072071 | 3/1999 |
| JP | 11-171041 | 6/1999 |
| JP | 2007-177714 | 7/2007 |

* cited by examiner

AIR CLEANER UNIT FOR VEHICLE AND FAN SHROUD HAVING THE SAME

CROSS REFERENCE TO RELATED APPLICATION

This application is based on Japanese Patent Application No. 2007-304850 filed on Nov. 26, 2007, the disclosure of which is incorporated herein by reference.

FIELD OF THE INVENTION

The present invention relates to an air cleaner unit for a vehicle and a fan shroud having the air cleaner unit.

BACKGROUND OF THE INVENTION

In general, a fan for supplying heat exchangers, such as a radiator and a condenser, with a cooling air is supported by a fan shroud. For example, Japanese Unexamined Patent Application Publication No. 11-171041 describes a fan shroud integrally having an air cleaner housing.

The described fan shroud form recess parts at an upper portion thereof as the air cleaner housing. Each of the recess parts is open to a rear side of the fan shroud. An air cleaner element for removing fine particles such as dust from air is arranged in the recess part, and a rear opening of the recess part is covered by a cover member. As such, an air cleaner unit is integrated into the fan shroud. The described fan shroud also has inlet openings for introducing air into the recess parts on its front wall. The cover members have outlet openings for discharging the air, which has been cleaned through the air cleaner element, from the air cleaner housing.

In such an air cleaner unit, the inside space provided by the recess part is almost occupied by the air cleaner element. Therefore, the resistance to flow of the air from the inlet openings to the outlet openings through the air cleaner element is likely to increase. The increase in the resistance to flow of the air results in a decrease in the amount of intake air to be introduced to an engine of a vehicle and deterioration of engine power. Also, if rain and snow are introduced in the air cleaner unit with the air, the rain and snow are accumulated in the inside space, and thus the air cleaner element will be soaked.

SUMMARY OF THE INVENTION

In an air cleaner unit, it will be considered to increase the inside space of the air cleaner housing so as to restrict entry of water into an engine. In such a case, an air cleaner housing will be arranged in a location without interfering with peripheral devices, and a duct is coupled to the air cleaner housing for introducing air to the air cleaner housing. However, an entire size of the air cleaner unit increases, and resistance to flow of the air increases because the length of air path is increases.

The present invention is made in view of the foregoing matter, and it is an object of the present invention to provide an air cleaner unit for a vehicle, capable of reducing an entire size and reducing resistance to flow of intake air to be introduced in an engine of the vehicle.

According to a first aspect of the present invention, an air cleaner unit includes an air cleaner housing and an air cleaner element. The air cleaner unit is to be arranged generally above ring portions of a fan shroud surrounding axial-flow fans. The air cleaner housing defines an intake air passage through which an intake air to be introduced to an engine of the vehicle flows. The air cleaner element is disposed in the air cleaner housing such that a predetermined space is provided between a lower surface of the air cleaner element and an inner surface of a bottom wall of the air cleaner housing. The bottom wall of the air cleaner housing includes at least two arcuate portions to correspond to the ring portions of the fan shroud, and a projecting portion between the arcuate portions. The projecting portion projects downwardly beyond the arcuate portions.

In such a configuration, the predetermined space is provided under the air cleaner element within the air cleaner housing, a suctioning surface area of the air cleaner element is increased. In addition, since the bottom wall of the air cleaner housing has the projecting portion between the arcuate portions, a vertical dimension of the predetermined space is larger at a location corresponding to the projecting portion than locations corresponding to the arcuate portions. The volume of the predetermined space is increased by the projecting portion. In other words, the volume of the predetermined space is increased by effectively using the space above the ring portions of the fan shroud. Accordingly, resistance to flow of the intake air through the air cleaner element is reduced. Further, an entire size of the air cleaner unit is not increased. For example, the volume of the air cleaner housing is increased without increasing the height of the air cleaner housing in an engine compartment of the vehicle.

According to a second aspect of the present invention, an air cleaner unit for a vehicle includes an air cleaner element and an air cleaner housing. The air cleaner housing defines an intake air passage through which an intake air to be introduced in a engine of the vehicle flows. The air cleaner housing is to be arranged above ring portions of a fan shroud. The air cleaner housing has a base rectangular dimension having a longitudinal axis in an alignment direction of the ring portions. The air cleaner element disposed in the air cleaner housing such that a cleaner upstream space is provided between a lower surface of the air cleaner element and an inner bottom surface of the air cleaner housing. The cleaner upstream space is configured to increase resistance to flow of the intake air and capture contaminants such as water and fine particles removed from the intake air. The air cleaner housing has a space increasing projection projecting downwardly beyond the base rectangular dimension at its bottom. The space increasing projection is configured to increase the volume of the cleaner upstream space.

In such a configuration, the volume of the cleaner upstream space is increased by the projecting portion. That is, the volume of the cleaner upstream space is increase by effectively using the space above the ring portions of the fan shroud. Thus, an entire size of the air cleaner unit is not increased. Further, resistance to flow of the intake air through the air cleaner element is reduced.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

Figure 1:
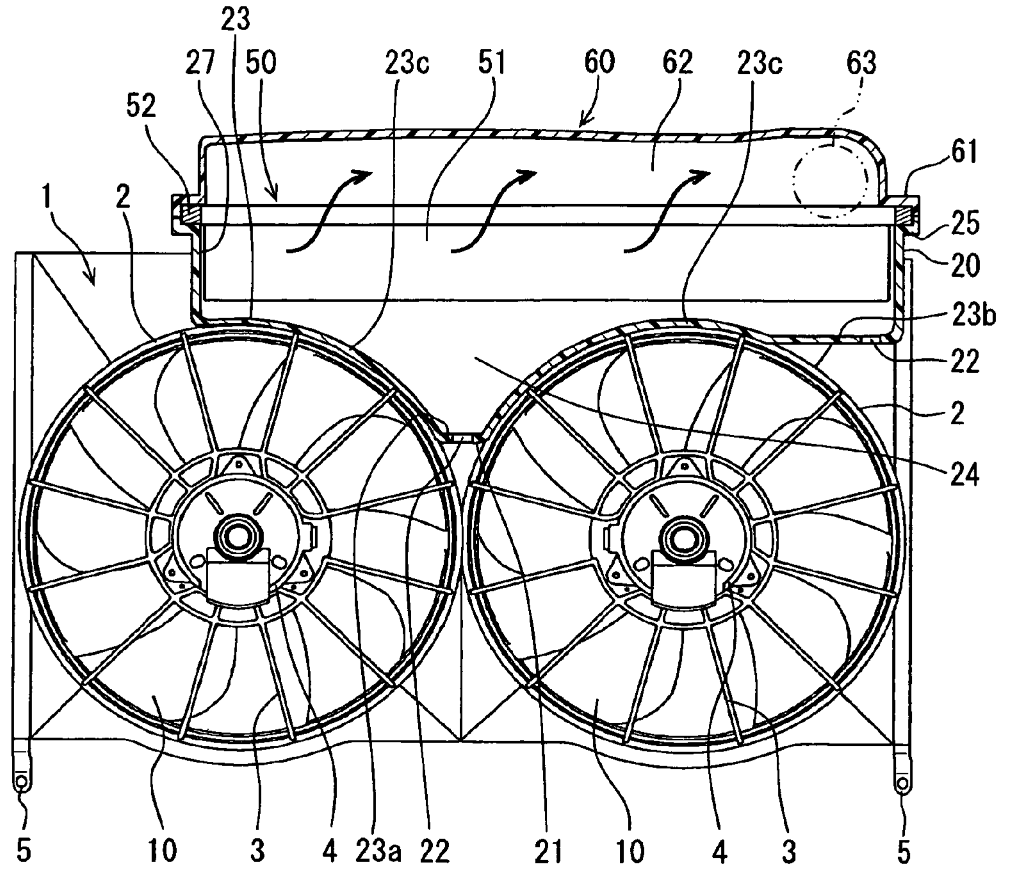
FIG. 1 is a schematic plan view of a fan shroud and an air cleaner unit, when viewed from a rear position of the vehicle, according to a first embodiment of the present invention.

Exemplary embodiments of the present invention are hereinafter described in detail with reference to the drawings. Here, like components are denoted by like reference characters and a description thereof is not repeated.

First Embodiment

In a vehicle, fans 10 for supplying a heat exchanger such as a radiator 70 with a cooling air are supported through a fan shroud 1. The fan shroud 1 is, for example, arranged on a rear side of the radiator 70 in an engine compartment. An air cleaner unit 50 for purifying intake air A to be introduced in an engine of the vehicle is integrated with the fan shroud 1.

The air cleaner unit 50 includes an air cleaner housing 20 integrated with the fan shroud 1, an air cleaner element 50 and a cap member 60. An inlet duct member 40 for suctioning outside air as the intake air is coupled to the air cleaner housing 20. The cap member 60 is coupled to the air cleaner housing 20. The air cleaner element 51 is disposed inside of the air cleaner housing 20 for removing fine particles such as dust from the intake air.

Figure 2:
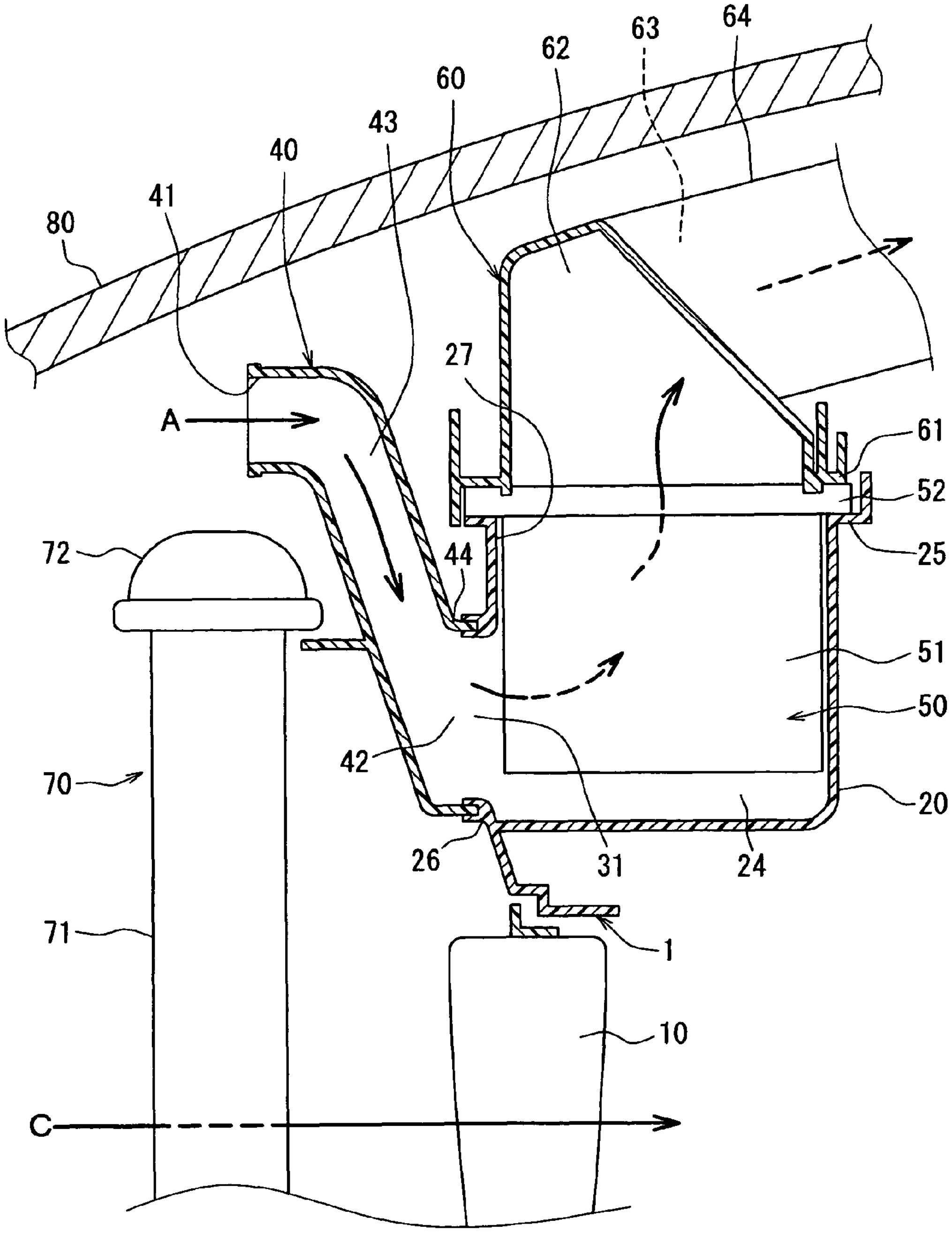
FIG. 2 is a cross-sectional view of the fan shroud and the air cleaner unit mounted in an engine compartment of a vehicle according to the first embodiment.

As shown in FIG. 2. the air cleaner housing 20 has a generally duct shape defining a base rectangular dimension and has a length in a horizontal direction, such as in a vehicle right and left direction. The air cleaner housing 20 has upstream coupling portions 26 on one side, such as a front side, and a downstream coupling portion 25 on another side, such as a top side. The upstream coupling portions 26 provide upstream openings 31. The downstream coupling portion 25 provide a downstream opening 27.

The upstream coupling portions 26 of the air cleaner housing 20 are coupled to downstream coupling portions 44 of the inlet duct member 40, such as by welding, engaging, or the like. The downstream coupling portion 25 of the air cleaner housing 20 is coupled to an upstream coupling portion 61 of the cap member 60.

Each of the upstream openings 31 has a rectangular shape having a length in a longitudinal direction of the air cleaner housing 20, such as in the vehicle right and left direction. The downstream opening 27 has a rectangular shape with a cross-sectional area substantially the same as a cross-sectional area of the air cleaner element 51. The downstream opening 27 is located higher than an upper end of the radiator 70, such as an upper tank 72 of the radiator 70.

The air cleaner unit 50 is provided to remove fine particles such as dust from the intake air and supply the clean intake air to the engine. The air cleaner element 51 of the air cleaner unit 50 is a filter medium made of non-woven fabric, for example. The air cleaner element 51 can be constructed of any types of filter medium, such as a dry-type having a filter folded in a wave shape and fixed in a resin or metal frame, a viscous-type having a filter infiltrated with oil for improving an adsorption effect, or the like. Further, the air cleaner element 51 can be divided into plural sections in the horizontal direction.

The inlet duct member 40 forms air inlets 41 at a front end thereof and has the downstream coupling portions 44 at a downstream end. The air inlets 41 are open in a vehicle frontward direction. The downstream coupling portions 44 are coupled to the upstream coupling portions 26 of the air cleaner housing 20. The inlet duct member 40 is a generally flat duct member having plural passage parts (e.g., three passage parts). The passage parts define intake air passages 43 between the air inlets 41 and downstream openings 42 defined by the downstream coupling portions 44.

Further, the inlet duct member 40 has a substantially L-shape in a vertical cross-section, as shown in FIG. 2. The inlet duct member 40 is coupled to the air cleaner housing 20 such that the downstream openings 42 are located lower than the air inlets 41 and on the rear side of the air inlets 41. Further, the air inlets 41 are located above the radiator 70, which is mounted in front of the engine, and the downstream openings 42 are located above blades of the fan 10 or above ring portions 2 of the fan shroud 1.

In other words, the inlet duct member 40 has a shape that extends from the air cleaner housing 20 in a generally upward direction, bends in the vehicle frontward direction, and extends to a location above the upper tank 72 of the radiator 70. For example, the inlet duct member 40 includes horizontal portions extending horizontally from the air inlets 41 and downward portions extending downwardly from the rear ends of the horizontal portions to the upstream coupling portions 26 of the air cleaner housing 20 along guide walls 8 of the fan shroud 1. The inlet duct member 40 is a resin molded article. The inlet duct member 40 is, for example, made of polypropylene.

In the present embodiment, the air cleaner housing 20 is made of a resin and is integrally formed with the fan shroud 1. For example, the air cleaner housing 20 and the fan shroud 1 are integrally formed such as by injection molding using a predetermined die. The filter 20 and the fan shroud 1 are formed by a resin material, such as polypropylene, a strength of which is increased by glass fiber, a talc material and the like.

Alternatively, the air cleaner housing 20 and the fan shroud 1 can be formed separately from each other, as a second embodiment described later. In such a case, the air cleaner housing 20 is integrated with the fan shroud 1 in a manner described later.

The air cleaner housing 20 is a casing integrated with the fan shroud 1. The air cleaner housing 20 has a substantially rectangular parallelepiped shape providing a housing inner space therein. The air cleaner element 51 is disposed in the air cleaner housing 20 to occupy middle and upper areas of the housing inner space, as shown in FIGS. 1 and 2. The air cleaner element 51 has a flange portion 52 extending in a horizontal direction, and the flange portion 52 is held between the downstream coupling portion 25 of the air cleaner housing 20 and the upstream coupling portion 61 of the cap member 60, with respect to the up and down direction. Thus, the air cleaner element 51 is held at a predetermined position within the air cleaner housing 20.

The air cleaner element 51 is held at the predetermined position such that a predetermined space, that is, a cleaner upstream space 24 is provided between a lower end of the air cleaner element 51 and a bottom wall 23 of the air cleaner housing 20. The cleaner upstream space 24 has a generally rectangular parallelepiped shape.

As shown in FIG. 2, since the cleaner upstream space 24 is provided, the outside air A passing through the intake air passages 43 can sufficiently flow into a lower side of the air cleaner element 51. Thus, the outside air A can be effectively introduced in the air cleaner element 51 using the wide area of the air cleaner element 51. That is, a surface area of the air cleaner element 51 through which the outside air flows in the air cleaner element 51 is increased. In such a case, further, resistance to flow of the outside air is reduced and efficiency of capturing the fine particles improves.

Under conditions of snowfall and rainfall, snow and rain will be introduced in the intake air passages 43 with the outside air A. Even in such a case, since the cleaner upstream space 24 is provided under the air cleaner element 51 with a sufficient volume, a predetermined volume of the snow and rain can be stored in the cleaner upstream space 24. Thus, it is less likely that the air cleaner element 51 will be soaked.

Further, even when a large amount of the snow and rain is introduced in the air cleaner housing 20, it is delayed to soak the air cleaner element 51 with the snow and rain. Even in a condition where the water and the like are stored in the cleaner upstream space 24, the water and the like can be evaporated such as by heat radiated from the radiator 70, air ventilation or natural evaporation.

The bottom wall 23 of the air cleaner housing 23 has at least one through hole 22 as a drain hole for draining the water and the like. In the example shown in FIG. 1, the bottom wall 23 has plural through holes 22 at locations 23*a*, 23 fan than the uppermost ends of the ring portions 2 of the fan shroud 1. For example, at least one through hole 22 is formed at the lowermost location 23*a* of the bottom wall 23. Since the bottom wall 23 has at least one through hole 22, the water and the like stored in the cleaner upstream space 24 can be discharged from the air cleaner housing 20 to the outside of the vehicle. Further, the through hole 22 restricts the water and the like from being stored in the cleaner upstream space 24 for a long time. Also, the through hole 22 reduces updraft of vapor toward the air cleaner element 51.

The bottom wall 23 has a predetermined shape corresponding to the ring portions 2 of the fan shroud 1 on the rear side of the guide walls 8. In the present embodiment, since the fan shroud 1 has the two ring portions 2, the bottom wall 23 has two arcuate portions 23*c* each having an arc shape along the ring portion 2 and a projecting portion 21 between the arcuate portions 23*c*. In other words, the bottom wall 23 has a substantially M-shape, when viewed along a direction parallel to a rotation axis of the fans 10.

Further, the bottom wall 23 is located on a rear side of the fan shroud 1 and extends toward the engine without approaching to the fan 10 beyond the ring portion 2. Side walls of the downstream coupling portion 25 of the filter housing 20 substantially extend in the up and down direction. As such, the bottom wall 23 is configured such that the cleaner upstream space 24 is provided effectively using the space above the ring portions 2. Further, the bottom wall 23 is configured not to interfere with downstream areas of the fans 10. As such, the volume of the cleaner upstream space 24 is effectively increased above the ring portions 2 without increasing the resistance to flow of the cooling air blown by the fans 10.

Since the bottom wall 23 of the air cleaner housing 20 has the arcuate portions 23*c* corresponding to the ring portions 2, the volume of the cleaner upstream space 24 is increased. Therefore, the above discussed effects can be further enhanced.

The fan shroud 1 has the two ring portions 2 in the horizontal direction, as shown in FIG. 1. The bottom wall 23 of the air cleaner housing 20 has the projecting portion 21 projecting downwardly beyond the arcuate portions 23*c* at a location where the two ring portions 2 are most close to each other. For example, the projecting portion 21 has a substantially V shape between the arcuate portions 23*c*. In such a case, the projecting portion 21 provides the lowermost portion 23*a* within the bottom wall 23, and the through hole 22 is formed at the lowermost portion 23*a*.

For example, the projecting portion 21 projects downwardly beyond the base rectangular dimension of the housing 20, that is, beyond a bottom base plane (dashed line L1 in FIG. 3) passing through the uppermost ends of the arcuate portions 23*c*.

Thus, a vertical dimension between the lower end of the air cleaner element 51 and the bottom end of the projection wall portion 21 is greater than a vertical dimension between the lower end of the air cleaner element 51 and a portion of the bottom wall 23 other than the projecting portion 21. That is, a vertical length of the cleaner upstream space 24 is increased at the location corresponding to the projecting portion 21. As such, the volume of the cleaner upstream space 24 is effectively increased.

The cap member 60 generally includes the body part and the duct part 64. The body part of the cap member 60 provides a generally flat cover member, and has a length in the longitudinal direction of the air cleaner housing 20, such as in the vehicle right and left direction. The body part of the cap member 60 has the upstream coupling portion 61 at its lower end. The upstream coupling portion 61 forms an upstream opening. The upstream coupling portion 61 has a shape to be capable of being connected to the downstream coupling portion 25 of the air cleaner housing 20 through the flange 52 of the air cleaner element 51. The body part of the cap member 60 forms an intake air chamber 62 therein. The duct part 64 extends from a downstream opening 63 of the body part. Thus, the air cleaner housing 20 is in communication with the duct part 64 through the intake air chamber 62.

The duct part 64 is in communication with an intake air port of the engine mounted on the rear side of the air cleaner unit 50. Thus, the duct part 64 forms a part of an intake air path for introducing the intake air A into the engine. The cap member 60 is formed of a resin material, such as polypropylene, containing glass fiber, a talc material and the like so as to provide the sufficient strength.

Recently, allowable spaces in an engine compartment are limited such as due to requirement of size-reduction of the vehicles and the increase in the number of electrical devices mounted in the engine compartment. In such a circumstance, it is difficult to increase a distance between a bonnet 80 and the inlet duct member 40 and cap member 60. With this, it is difficult to enlarge the air cleaner unit 50, particularly in an upward direction.

In the present embodiment, the air cleaner housing 20 having the above-described structure and integrated into the fan shroud 1 is employed. In such a case, the volume of the cleaner upstream space 24 is increased without increasing the height of the air cleaner unit 50. Since the cleaner upstream space 24 has the sufficient volume, the resistance to flow of the intake air reduces and the efficiency of capturing the fine particles improves.

The fan shroud 1 has a generally rectangular shape and is configured to support the fans 10 (e.g., two fans). The fans 10 are aligned in the horizontal direction. The fans 10 are, for example, axial-flow fans. The fans 10 are arranged relative to the core part 71 of the radiator 70 for generating the cooling air passing through the core part 71.

The fan shroud 1 has the ring portions 2 surrounding the fans 10, the guide walls 8 extending between a front peripheral end and the ring portions 2. The fan shroud 1 further has motor fixing portions 4 to which motors for driving the fans 10 are fixed and leg portions 3 radially extending from the motor fixing portions 4 to the ring portions 2. The ring portions 2 are integrally formed with the leg portions 3 and support the motor fixing portions 4 through the leg portions 3. The ring portions 2 each have the ring shape and is located on an outer periphery of the blades of the fan 10.

The fans 10 are disposed downstream of the radiator 70 with respect to the flow of cooling air (arrow C in FIG. 2). The motors are arranged such that the rotation shafts extend in the vehicle front and rear direction. As the motors rotate, the fans 10 draw the outside air through a grill portion that are provided at a front end of the vehicle. For example, the motor is an electric motor such as a ferrite d.c. motor. Harnesses are connected to the motors for supplying armatures with electric power. The harnesses are connected to a battery of the vehicle through connectors and the like.

Figure 3:
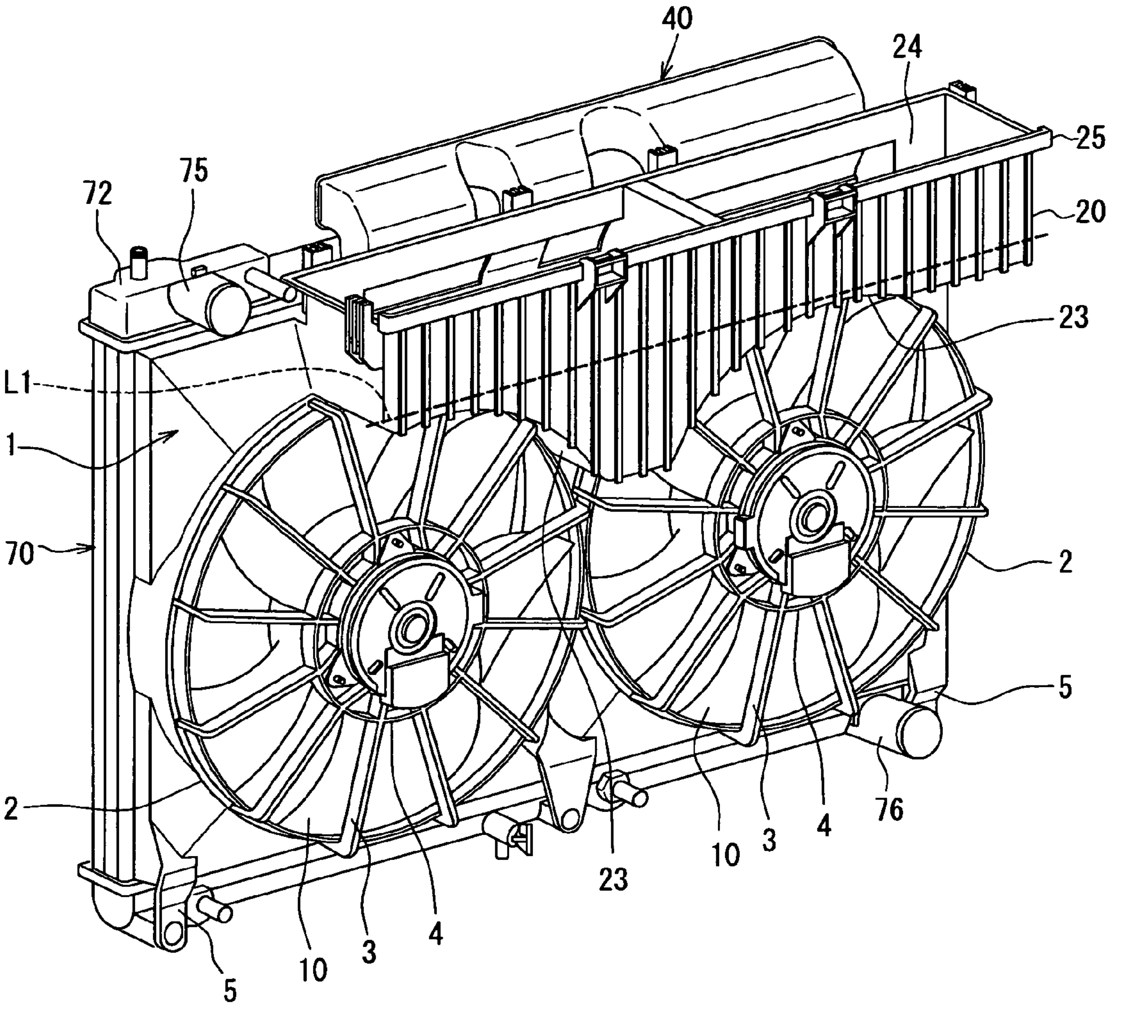
FIG. 3 is a perspective view of the fan shroud, an air cleaner housing, an inlet duct member and a radiator, when viewed from a diagonally rear position of the vehicle, according to the first embodiment.
Figure 4:
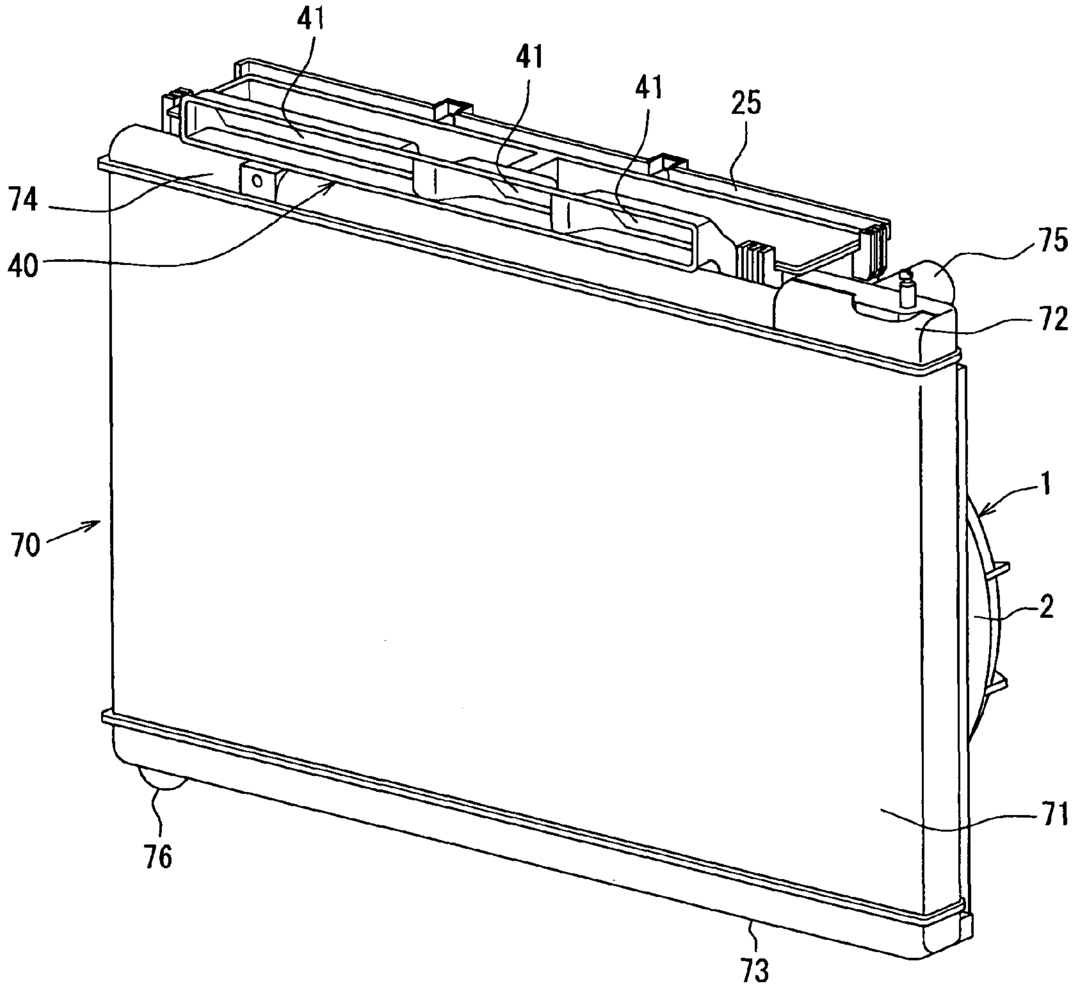
FIG. 4 is a perspective view of the radiator, the fan shroud, the air cleaner housing and the inlet duct member, when viewed from a diagonally front position of the vehicle, according to the first embodiment.

FIG. 3 shows the fan shroud 1, the air cleaner housing 20, the inlet duct member 40 and the radiator 70 when viewed from a diagonally rear position of a vehicle, such as from an engine side. FIG. 4 shows the radiator 70, the fan shroud 1, the air cleaner housing 20 and the inlet duct member 40 when viewed from a diagonally front position of the vehicle. In FIGS. 3 and 4, the cap member 60 and the air cleaner element 51 are removed.

As shown in FIGS. 3 and 4, the radiator 70 generally includes a core part 71, the upper tank 72 and a lower tank 73. The core part 71 includes tubes through which the engine coolant flows and fins disposed between the tubes. For example, the radiator 70 is arranged such that the tubes extend in the up and down direction. The upper tank 72 and the lower tank 73 are connected to the upper ends and the lower ends of the tubes.

Further, the radiator 7 has an inlet pipe 75 for introducing the engine coolant into the radiator 7 and an outlet pipe 76 for discharging the engine coolant from the radiator 7. For example, the inlet pipe 75 is coupled to the upper tank 72. The inlet pipe 75 extends toward the engine on a rear side of the upper tank 72 and connects to a radiator circuit that is in communication with the inside of the engine. Also, the outlet pipe 76 is coupled to the lower tank 73. The outlet pipe 76 extends toward the engine on a rear side of the lower tank 73 and connects to the radiator circuit for returning the engine coolant into the radiator circuit.

The inlet pipe 75 is, for example, coupled to the rear side of the upper tank 73 adjacent to a first end of the upper tank 72. The upper tank 72 has a recessed portion 74 where a height of the upper tank 72 is lowered other than the first end. The inlet duct member 40 is arranged such that the air inlets 41 are located above the recessed portion 74 of the upper tank 72. In the present embodiment, the inlet duct member 40 has multiple air inlets 41 (e.g., three air inlets). In such a case, the air inlets 41 are aligned in a longitudinal direction of the upper tank 72.

The fan shroud 1 has at least two lower fixing portions 5 and at least two upper fixing portions 7. The lower fixing portions 5 extend from the lower end of the fan shroud 1. The upper fixing portions 7 extend from the upper end of the fan shroud 1. Each of the lower and upper fixing portions 5, 7 is formed with a through hole for allowing a fixing member, such as a screw, to pass through. The fan shroud 1 is fixed to the radiator 70 by fixing the lower and upper fixing portions 5, 7 to fixing portions of the radiator 70. For example, the fixing portions of the radiator 70 form female thread, and the screws and the like are fastened with the female thread of the radiator 70 through the through holes of the lower and upper fixing portions 5, 7, thereby to fix the fan shroud 1 to the radiator 7.

The radiator circuit is provided with a water pump. Thus, the engine coolant is circulated through the radiator circuit and the radiator 70, as the water pump is driven. For example, the engine coolant flows in the upper tank 72 from the radiator circuit, passes through the tubes in the downward direction, flows in the lower tank 73, and returns to the radiator circuit from the lower tank 73. While passing through the tubes, the engine coolant is cooled by heat exchange with the cooling air.

Figure 5:
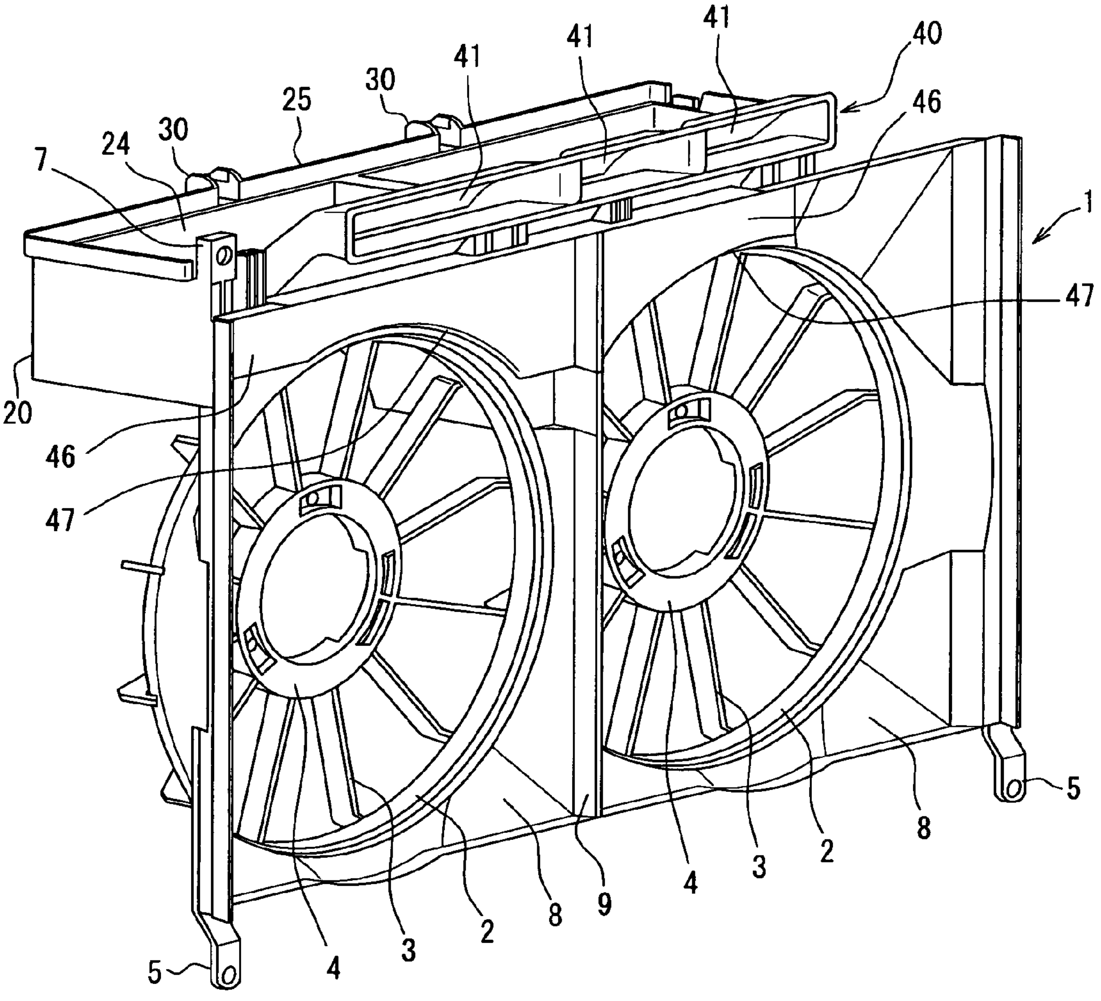
FIG. 5 is a perspective view of the fan shroud, the air cleaner housing and the inlet duct member according to the first embodiment.
Figure 6:
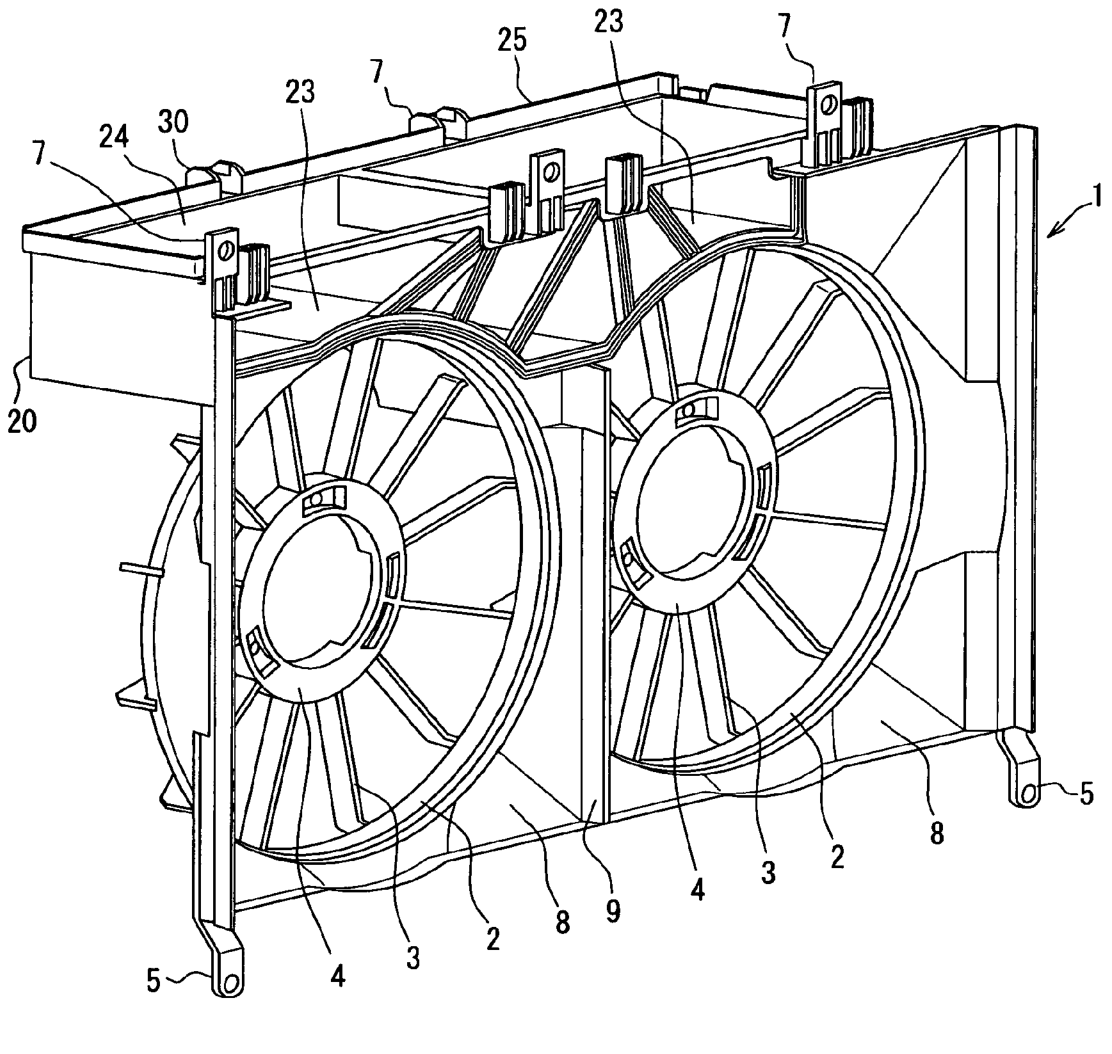
FIG. 6 is a perspective view of the fan shroud and the air cleaner housing, when viewed from the diagonally front position, according to the first embodiment.

Next, other structures of the fan shroud 1 will be described with reference to FIGS. 5 and 6. FIG. 5 shows the fan shroud 1 to which the inlet duct member 40 is coupled, when viewed from the diagonally front position. FIG. 6 shows the fan shroud 1 from which the inlet duct member 40 is removed, when viewed from the diagonally front position.

Each of the guide walls 8 extends from the front peripheral end of the fan shroud 1 to the corresponding ring portion 2, and is inclined or generally curved. The front peripheral end is adjoined to a peripheral end of the core part 71 of the radiator 70. The guide walls 8 serve to effectively draw the outside air C through the entirety of the core part 71 of the radiator 7. The guide walls 8 each provide a generally tubular space from the front peripheral end toward the ring portion 2. Thus, the cooling air passage is effectively formed from the core part 71 to the ring portion 2. Further, the above shape of the guide wall 8 contributes to create an efficient air passage of the outside air.

The inlet duct member 40 has a lower front wall 46 that has a shape along the guide walls 8, such as a shape along a generating line of the shroud, in a condition that the inlet duct member 40 is attached to the air cleaner housing 20. That is, the lower front wall 46 forms a smooth surface with the guide walls 8 without large steps between the lower front wall 46 and the guide walls 8, in a condition that the inlet duct member 40 is attached to the air cleaner housing 20. In other words, the lower front wall 46 forms a part of the guide walls 8. In such a configuration, the efficient air passage of the outside air is not disturbed. Further, a lower end 47 of the lower front wall 46 has a shape corresponding to the ring portions 2. For example, the lower end 47 has arcuate edge portions corresponding to the ring portions 2 and a substantially V-shaped portion between the arcuate edge portions.

Next, a flow of the outside air will be described. Outside air is introduced in the engine compartment through the front grill portion and the like. The outside air partly passes through the core part 71 of the radiator 70 such as by the suction force generated by the fans 10, as shown by the arrow C in FIG. 1, and contributes to cool the engine coolant. Also, the outside air is partly introduced in the inlet duct member 40 from the air inlets 41 to be conducted to the engine as the intake air, as shown by the arrows A in FIG. 1.

In the inlet duct member 40, the outside air A passes through the intake air passages 43 in the generally downward direction, and flows in the air cleaner housing 20 through the downstream openings 42. In the air cleaner housing 20, the outside air A makes generally two flows, one entering the air cleaner element 51 through a front surface of the air cleaner element 51 facing the downstream openings 42 and the other flowing into the cleaner upstream space 24 and entering the air cleaner element 51 through a lower surface of the air cleaner element 51 facing the cleaner upstream space 24.

For example, the upstream openings 31 are formed over an area facing the front surface of the air cleaner element 51 and a front side of the air cleaner upstream space 24. Thus, the above two flows are effectively created.

Since the downstream openings 42 are aligned in the longitudinal direction of the air cleaner housing 20, such as in the vehicle right and left direction, the outside air A can pass through the air cleaner element 51 while widely expanding in the longitudinal direction of the air cleaner housing 20. Further, the suctioning surface area of the air cleaner element 51 is sufficiently provided and the sufficient spaces are provided upstream locations of the introducing surface of the air cleaner element 51. As such, the resistance of the outside air A to pass through the air cleaner element 51 is reduced. In addition, the cleaner upstream space 24 is located at a lower position in the intake air path of the outside air A from the air inlets 41 toward the engine. Therefore, foreign materials, such as water and snow, having a large mass fall on the bottom wall 23 of the air cleaner housing 20.

Since the air cleaner element 20 has the projecting portion 21, the volume of the cleaner upstream space 24 facing the lower surface of the air cleaner element 51 is further increased. As such, the volume for dropping and capturing the foreign materials is increased. In the case where the through hole 22 is formed at the bottom portion 23*b* of the projecting portion 21, the foreign materials can be effectively drained to the outside of the vehicle through the through hole 22. Further, in the case where the bottom wall 23 of the air cleaner housing 20 has the arcuate portions 23*c* along the shape of the ring portions 2, the foreign materials can be smoothly conducted to the bottom of the projecting portion 21.

In the air cleaner element 51, contamination, such as fine particles, contained in the outside air A is adsorbed. Thus, the clean outside air is introduced in the intake air chamber 62 of the cap member 60. The outside air A is then introduced in the duct part 64 through the downstream opening 63, and is further introduced into the engine to be used for the combustion.

In the present embodiment, the air cleaner housing 20 is disposed in the intake air path through which the outside air, that is the intake air A, to be introduced to the engine flows. The air cleaner housing 20 has the substantially duct shape defining the part of the intake air path, and houses the air cleaner element 51 therein. The air cleaner housing 20 has the bottom wall 23 that is located lower than the upstream opening 31. The bottom wall 23 provides the predetermined space 24 between its inner surface and the lower surface of the air cleaner element 51. The bottom wall 23 is located generally above the ring portions 2 of the fan shroud 1, and has the shape corresponding to the ring portions 2. In other words, the bottom wall 23 includes the projecting portion 21 projecting downwardly beyond the base rectangular dimension of the air cleaner housing 20. For example, the bottom wall 23 has the two arcuate portions 23*c*, and the projecting portion 21 is formed between the arcuate portions 23*c* to project downwardly beyond the two arcuate portions 23*c*. Thus, the bottom wall 23 has the substantially M-shape.

In such a configuration, the volume of the cleaner upstream space 24 is increased without increasing the height of the air cleaner housing 20, that is, without rising the location of the top end of the air cleaner housing 20. Since the air cleaner housing 20 has the substantially duct shape having the length in the horizontal direction, such as in the vehicle right and left direction, a suctioning surface area of the air cleaner element 51 can be increased. Since the cleaner upstream space 24 is provided with a sufficient volume, the resistance to flow of the intake air through the air cleaner element 51 is reduced. Accordingly, pressure loss of the intake air A is reduced.

The rear end of the bottom wall 23 of the air cleaner housing 20 is located more to the rear position than the rear end of the fan shroud 1. The length of the cleaner upstream space 24 in the vehicle front and rear direction is increased. With this, the volume of the cleaner upstream space 24 is increased. As such, pressure loss of the intake air A in the air cleaner housing 20 is further reduced.

The inlet duct member 40 is coupled to the upstream coupling portions 26 of the air cleaner housing 20. The air inlets 41 of the inlet duct member 40 are located higher than the air cleaner element 51. In such a case, even if the water is introduced in the intake air passages 43 with the outside air A, it can be properly conducted in the cleaner upstream space 24. As such, it is less likely that the air cleaner element 51 will be soaked with the water.

Second Embodiment

A second embodiment of the present invention will now be described with reference to FIGS. 7 to 11. In the present embodiment, the fan shroud and the air cleaner housing are formed separately from each other and are integrated with each other. Structures of the present embodiment, except that the fan shroud and the air cleaner housing are separate members, are similar to those of the first embodiment, and thus similar effects are achieved.

Hereinafter, a procedure for assembling a fan shroud 1A, an air cleaner housing 20A, an inlet duct member 40A and the cap member 60 is described. In the present embodiment, respective parts of the fan shroud 1A, the air cleaner housing 20A and the inlet duct member 40A are denoted with the same reference numerals as the respective parts of the fan shroud 1, the air cleaner housing 20 and the inlet duct member 40 of the first embodiment.

Figure 7:
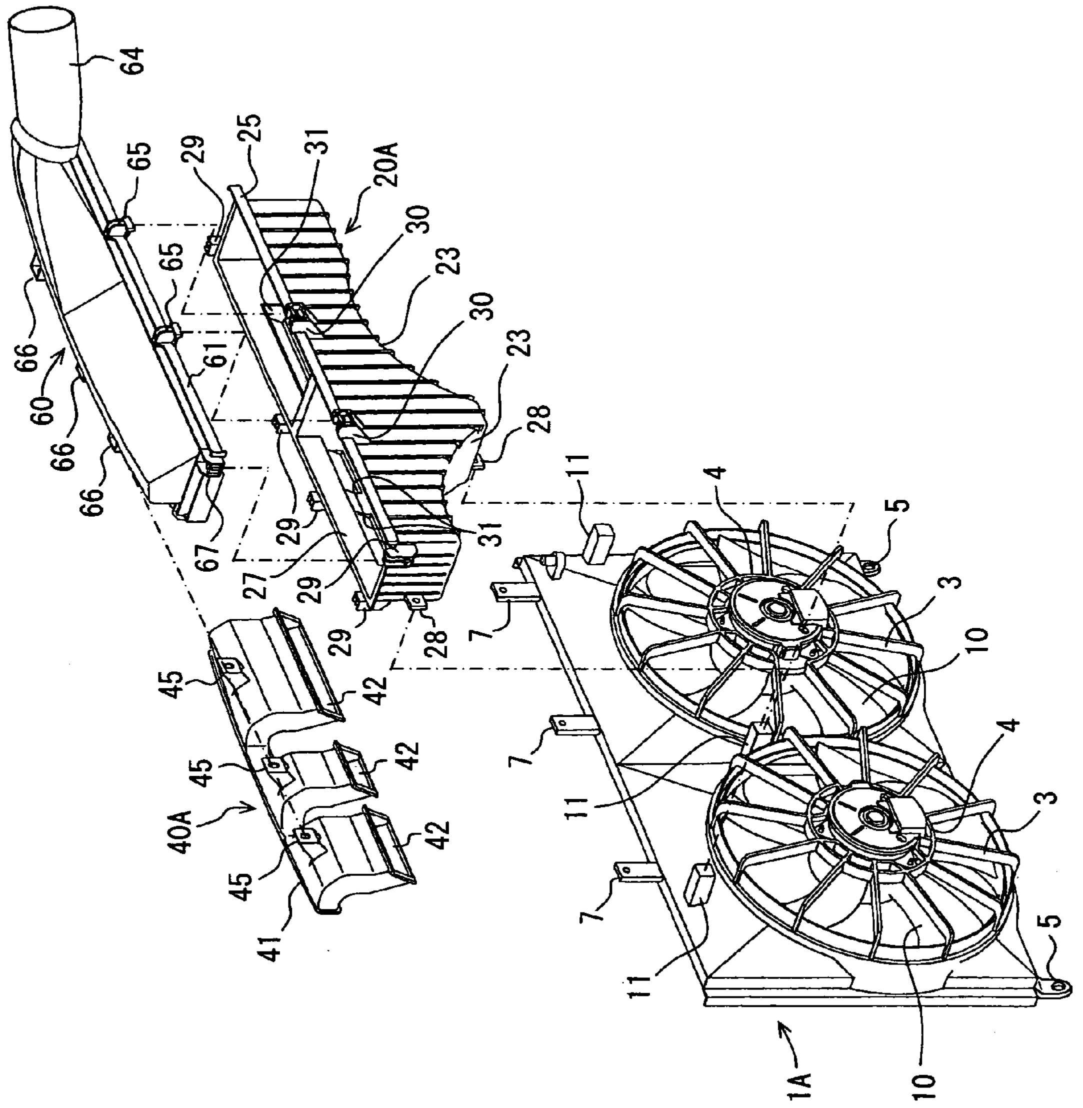
FIG. 7 is an exploded perspective view of a fan shroud, an air cleaner housing, an inlet duct member and a cap member, when viewed from the diagonally rear position, according to a second embodiment of the present invention.
Figure 8:
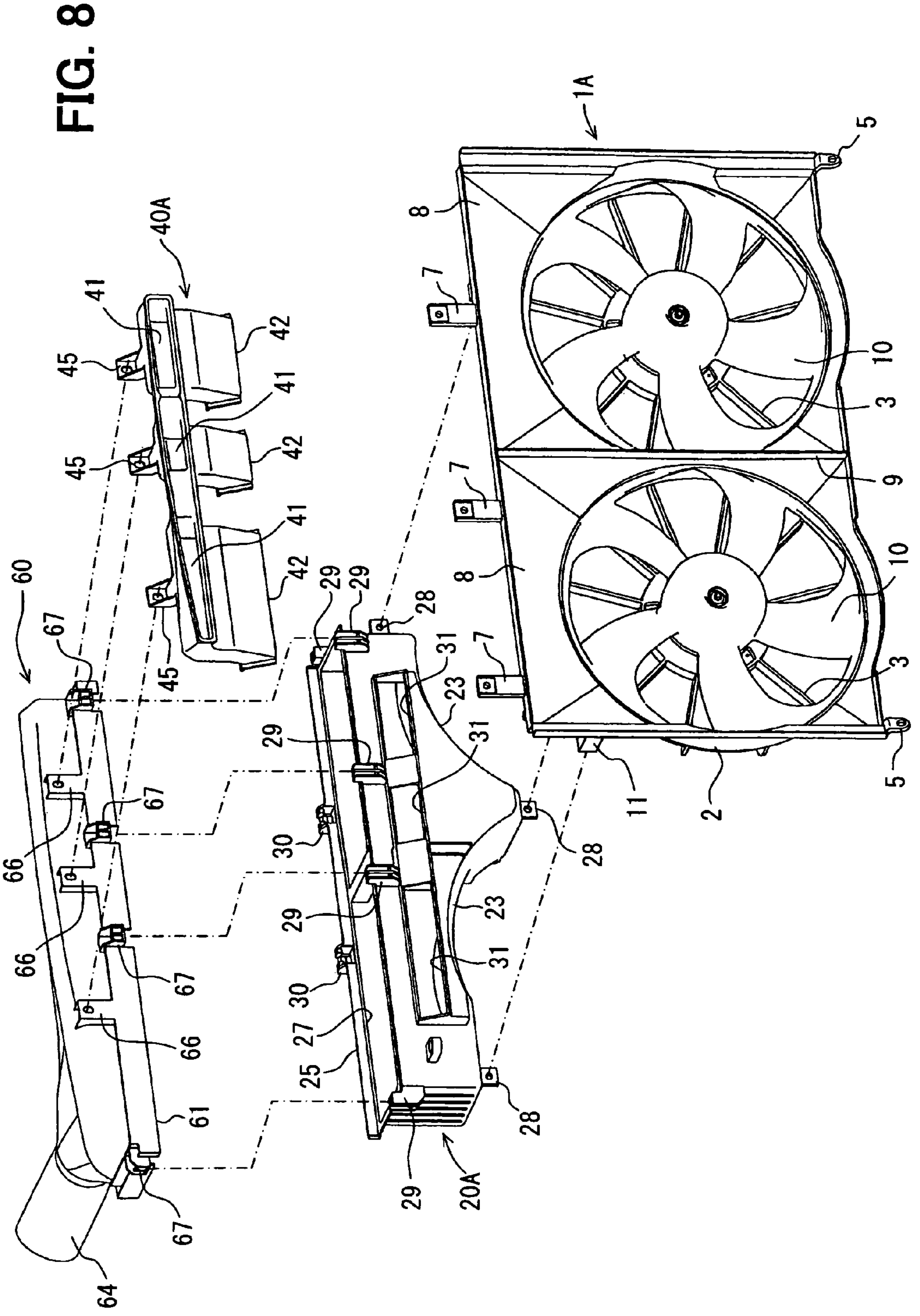
FIG. 8 is an exploded perspective view of the fan shroud, the air cleaner housing, the inlet duct member and the cap member, when viewed from the diagonally front position, according to the second embodiment.

FIG. 7 is an exploded perspective view of the fan shroud 1A, the air cleaner housing 20A, the cap member 60 and the inlet duct member 40A, when viewed from the diagonally rear position of the vehicle. FIG. 8 is an exploded perspective view of the fan shroud 1A, the air cleaner housing 20A, the cap member 60 and the inlet duct member 40A, when viewed from the diagonally front position of the vehicle.

The air cleaner housing 20A has three fixing portions 28 extending outwardly from its side wall and the bottom wall 23. Each of the fixing portions 28 is formed with a through hole. The fan shroud 1A has three fixing portions 11 on a rear upper portion. The fixing portions 11 are located to correspond to the fixing portion 28 of the air cleaner housing 20A. Each of the fixing portions 11 is formed with a female thread to correspond to the through hole of the fixing portion 28.

To fix the air cleaner housing 20A to the fan shroud 1A, the air cleaner housing 20A is adjacently placed to the rear side of the fan shroud 1A such that the fixing portions 28 are adjoined to the corresponding fixing portions 11 of the fan shroud 1A. Fixing members, such as screws and bolts, are fastened with the female thread of the fixing portions 11 through the through holes of the fixing portions 28 of the air cleaner housing 20A from the rear position.

The air cleaner housing 20A has five engagement portions 29 on a periphery of the downstream coupling portion 25. The engagement portions 29 project from the front wall and the side walls of the air cleaner housing 20A. Further, the air cleaner housing 20A has two engagement shaft portions 30 on an upper portion of the rear wall. The cap member 60 has five engagement portions 67 on a periphery of the upstream coupling portion 61. The engagement portions 67 project from the front wall and the side walls of the cap member 60 to correspond to the engagement portions 29 of the air cleaner housing 20A. Further, the cap member 60 has two engagement nails 65 extending from the rear wall to correspond to the engagement shaft portions 30 of the air cleaner housing 20A.

In addition, the cap member 60 has three front fixing portions 66 projecting from the front rim of the upstream coupling portion 61 in the upward direction. The inlet duct member 40A has three rear fixing portions 45 projecting from the rear wall in the upward direction.

To fix the cap member 60 to the air cleaner housing 20A, first, the cap member 60 is placed adjacent to the air cleaner housing 20A from a top of the air cleaner housing 20A. Then, the two engagement nails 65 are engaged with the engagement shaft portions 30 of the air cleaner housing 20A. Next, the cap member 60 is rotated about the engagement portions between the engagement nails 65 and the engagement shaft portions 30 so that the upstream coupling portion 61 of the cap member 60 overlaps the downstream coupling portion 25 of the air cleaner housing 20A. Further, the engagement portions 67 of the cap member 60 are engaged with the engagement portions 29 of the air cleaner housing 20A. Thereafter, the engagements between the engagement portions 29 of the air cleaner housing 20A and the engagement portions 67 of the cap member 60 are fixed by clip members or the like.

In such a case, the engagement shaft portions 30 and the engagement nails 65 are engaged in a hinge manner. With this structure, the number of fastening members is reduced. The number of working steps and the number of parts can be reduced.

Next, to fix the inlet duct member 40A to the air cleaner housing 20A, the inlet duct member 40A is first placed adjacent to the air cleaner housing 20A from the front side. The three downstream coupling portions 44 are coupled to the three upstream coupling portions 26 of the air cleaner housing 20A such that the three downstream openings 42 of the inlet duct member 40A are in communication with the three upstream openings 31 of the air cleaner housing 20A, respectively. The three rear fixing portions 45 of the inlet duct member 40A are adjoined to the three front fixing portions 66 of the air cleaner housing 20A. The rear fixing portions 45 and the front fixing portions 66 are fastened with each other through fixing members such as screws or bolts.

Figure 9:
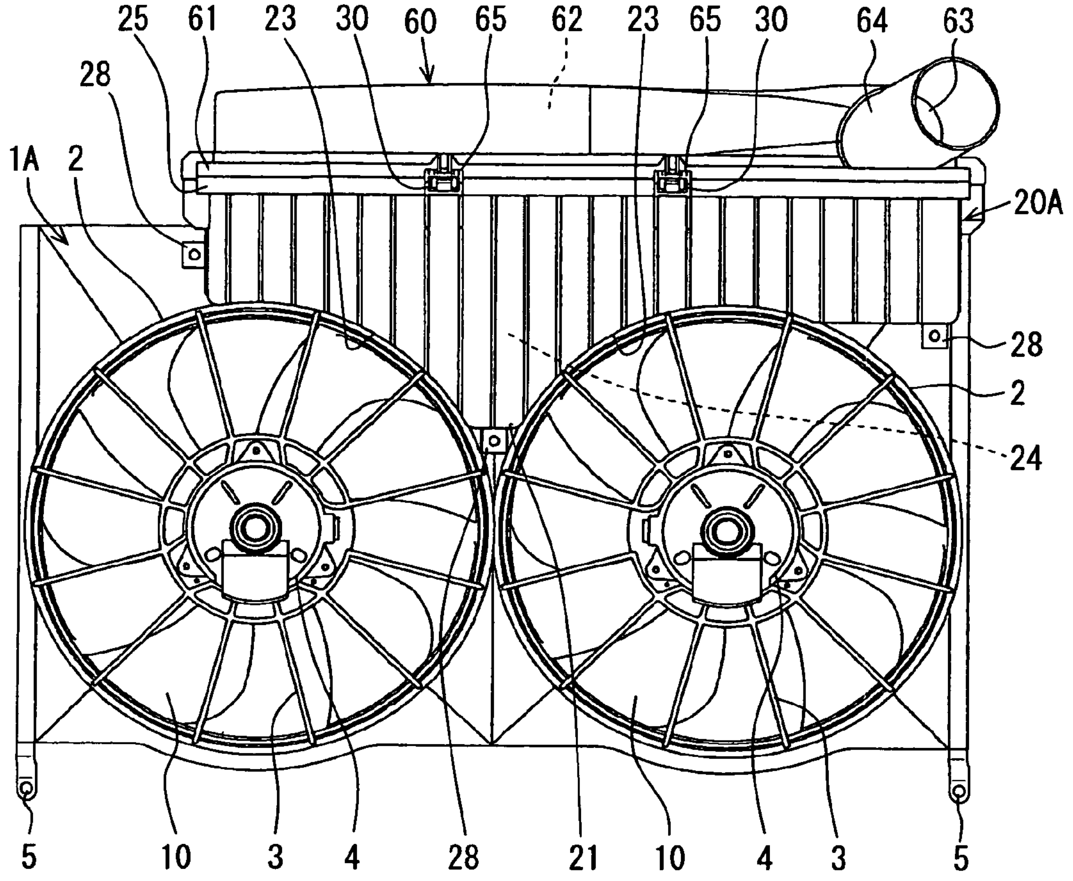
FIG. 9 is a schematic plan view of the fan shroud and an air cleaner unit, when viewed from the rear position, according to the second embodiment.
Figure 10:
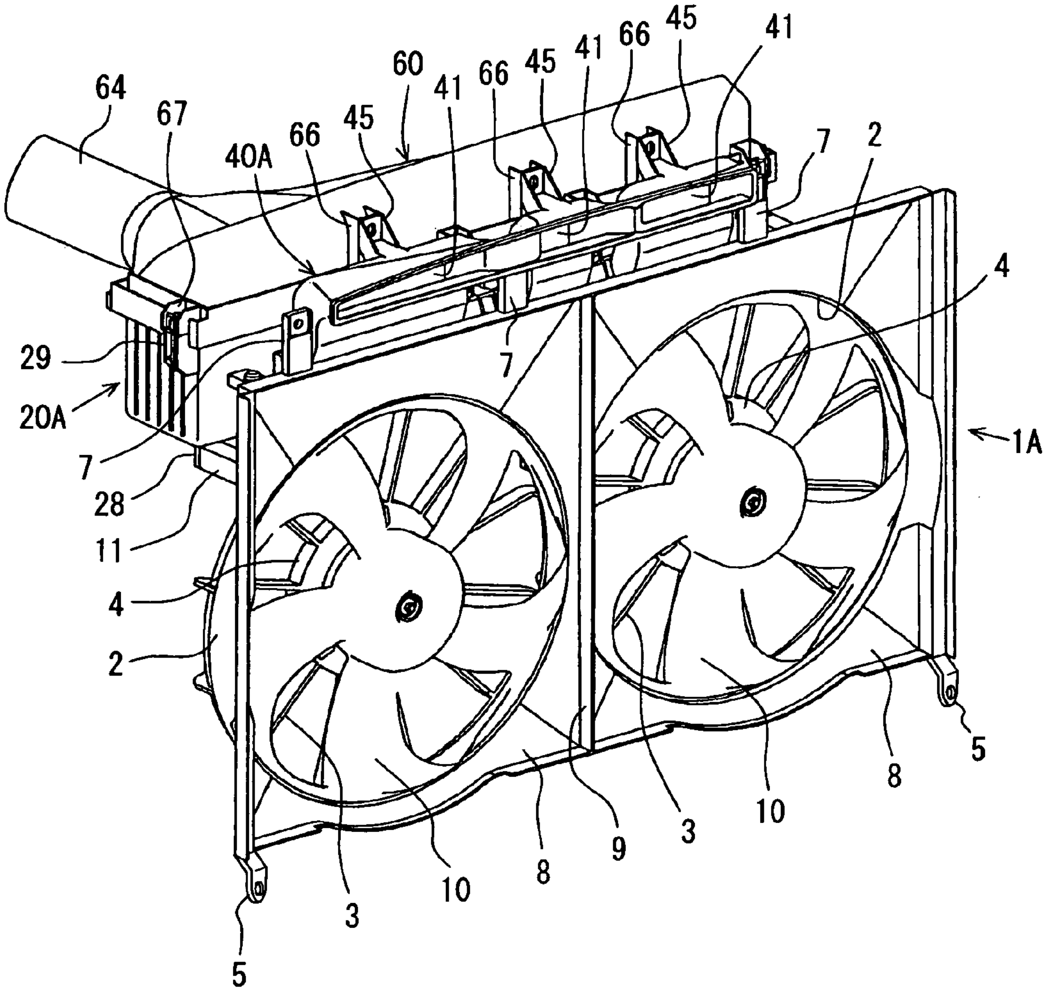
FIG. 10 is a perspective view of the fan shroud and the air cleaner unit, when viewed from the diagonally front position, according to the second embodiment.
Figure 11:
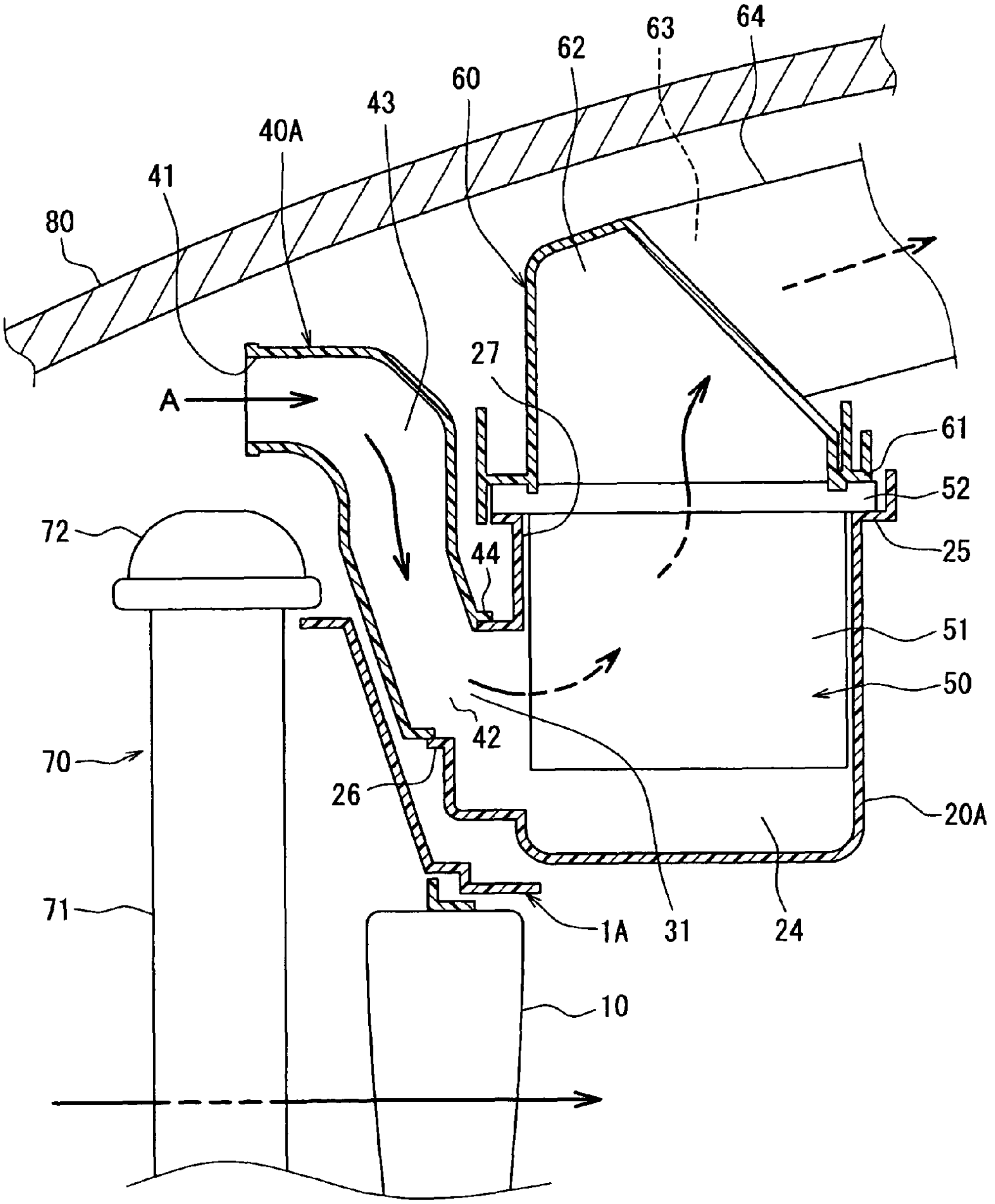
FIG. 11 is a cross-sectional view of the fan shroud and the air cleaner unit mounted in the engine compartment of the vehicle according to the second embodiment.

In this way, the fan shroud 1A, the air cleaner housing 20A, the cap member 60 and the inlet duct member 40A are integrated into a unit, as shown in FIGS. 9 to 10. FIG. 9 shows a rear view of the fan shroud 1A, the air cleaner housing 20A, the cap member 60 and the inlet duct member 40A. FIG. 10 shows a perspective view of the fan shroud 1A, the air cleaner housing 20A, the cap member 60 and the inlet duct member 40A, when viewed from the diagonally front position. FIG. 11 shows a perspective view of the fan shroud 1A, the air cleaner housing 20A, the cap member 60 and the inlet duct member 40A, when viewed from the diagonally rear position.

Other Embodiments

In the first and second embodiments, the fan shroud 1, 1A is made of a resin. Alternatively, the fan shroud 1, 1A can be made of a metal. In such a case, the fan shroud 1, 1A is formed by pressing or stamping using a die and by welding, for example.

In the first embodiment, the air cleaner housing 20 is integrally formed with the fan shroud 1. In the second embodiment, the air cleaner housing 20A and the fan shroud 1A are separate members and integrated with each other. As further another example, the air cleaner housing is first molded, and then is inserted in the die when the fan shroud is molded. That is, the air cleaner housing can be integrally formed with the fan shroud by insert molding.

In the first and second embodiments, the radiator 70 is exemplarily employed as the heat exchanger to be cooled. However, any other heat exchangers, such as a condenser of a refrigerant cycle, an intercooler for cooling the intake air, or the like, can be employed in place of the radiator 70.

In the first and second embodiments, the radiator 70 is a down-flow type in which the tubes are arranged in the up and down direction so that the engine coolant flows in the up and down direction. Alternatively, the radiator 70 can be a cross-flow-type in which the tubes are arranged horizontally so that the engine coolant flows in the horizontal direction.

In the first and second embodiments, the two fans 10 are fixed to the fan shroud 1, 1A. However, the number of the fans 10 is not limited to two. For example, one or three or more fans can be fixed to the fan shroud 1. In a case where the fan shroud 1, 1A supports one fan, the bottom wall 23 of the air cleaner housing may has one arcuate portion 23*c* and one or two projecting portions 21 on opposite sides of the arcuate portion 23*c*. Also in such a case, the volume of the cleaner upstream space 24 can be increased. In a case where the fan shroud 1, 1A supports three or more than three fans 10, the bottom wall 23 has the arcuate portions 23*c* with the same number as the fans 10, and multiple projecting portions 21 between the arcuate portions 23*c*. Also, in such a case, the volume of the cleaner upstream space 24 can be increased.

The fan shroud 1, 1A and the radiator 70 can be fixed to each other in any ways other than fastening using screws or bolts. For example, the fan shroud 1, 1A may be fixed to the radiator 70 by clips or by using brackets.

The present invention may be implemented by partly or entirely combining the structures of the above embodiments.

Additional advantages and modifications will readily occur to those skilled in the art. The invention in its broader term is therefore not limited to the specific details, representative apparatus, and illustrative examples shown and described.

What is claimed is:

1. An air cleaner unit for a vehicle, for being arranged generally above ring portions of a fan shroud surrounding axial flow fans, the air cleaner unit comprising:

an air cleaner housing defining an intake air passage therein through which an intake air to be introduced to an intake air port of an engine of the vehicle flows, the air cleaner housing having a bottom wall; and an air cleaner element disposed in the air cleaner housing such that a predetermined space defining the intake air passage, is provided between a lower surface of the air cleaner element and an inner surface of the bottom wall, wherein the bottom wall of the air cleaner housing includes at least two arcuate portions corresponding to the ring portions of the fan shroud, and a projecting portion disposed between the ring portions.

2. The air cleaner unit according to claim 1, wherein the bottom wall of the air cleaner housing has a drain hole at a location lower than uppermost ends of the arcuate portions.

3. The air cleaner unit according to claim 1, wherein the projecting portion provides a lowermost portion in the bottom wall.

4. The air cleaner unit according to claim 3, wherein the bottom wall has a drain hole at the lowermost portion.

5. The air cleaner unit according to claim 1, wherein the bottom wall has a rear end to be arranged more to a rear position in the vehicle than a rear end of the fan shroud.

6. The air cleaner unit according to claim 1, wherein the air cleaner housing has an upstream opening for introducing the intake air into the air cleaner housing, the air cleaner unit further comprising:

an inlet duct member coupled to the upstream opening of the air cleaner housing, wherein the inlet duct member having an air inlet for suctioning the intake air and defining a passage therein for allowing the intake air to flow to the air cleaner housing.

7. The air cleaner unit according to claim 6, wherein the inlet duct member extends downwardly from the air inlet toward the upstream opening of the air cleaner housing, and the air inlet of the inlet duct member is located higher than the air cleaner element.

8. A fan shroud comprising the air cleaner unit according to claim 1, wherein the fan shroud is integrally formed with the air cleaner housing.

9. An air cleaner unit for a vehicle, for being arranged generally above ring portions of a fan shroud, the air cleaner unit comprising:

an air cleaner housing defining an intake air passage through which an intake air to be introduced in an engine of the vehicle flows, the air cleaner housing having a base rectangular dimension having a longitudinal axis in an alignment direction of the ring portions; and an air cleaner element disposed in the air cleaner housing such that a cleaner upstream space is provided between a lower surface of the air cleaner element and a bottom inner surface of the air cleaner housing, the cleaner upstream space being configured to allow the intake air to pass through before flowing into the air cleaner element, wherein the air cleaner housing further having a space increasing projection projecting downwardly beyond the base rectangular dimension at a bottom, the space increasing projection being configured to increase the volume of the cleaner upstream space, and the space increasing projection is disposed between the ring portions of the fan shroud.

10. The air cleaner unit according to claim 9, wherein the air cleaner housing has at least two arcuate portions in its bottom wall, the arcuate portions corresponding to the ring portions of the fan shroud and to be disposed above the ring portions, and the space increasing projection is provided between the arcuate portions.

11. The air cleaner unit according to claim 10, wherein the space increasing projection defines a lowermost portion of the bottom wall of the air cleaner housing, and the air cleaner housing has a drain hole at the lowermost portion.

12. The air cleaner unit according to claim 9, wherein the air cleaner housing has an upstream opening in a front wall, the upstream opening allows the intake air to flow in the air cleaner housing, the upstream opening is provided over an area facing a front surface of the air cleaner element and the cleaner upstream space.

13. The air cleaner unit according to claim 12, wherein the upstream opening has a rectangular shape having a longitudinal axis in the alignment direction.

14. The air cleaner unit according to claim 12, further comprising:

an inlet duct member coupled to the upstream opening of the air cleaner housing for introducing the intake air into the air cleaner housing, wherein the inlet duct member has an air inlet through which the intake air is introduced in the inlet duct member, and the inlet duct extends downwardly from the air inlet toward the upstream opening of the air cleaner housing.

15. The air cleaner unit according to claim 12, wherein the fan shroud further includes a guide wall defining a shroud passage space upstream of the ring portions, and the inlet duct member is coupled to the air cleaner housing such that the inlet duct member provides a part of the guide wall.

16. The air cleaner unit according to claim 6, wherein the upstream opening is provided on a front side of the air cleaner housing in a front direction of the vehicle.

17. The air cleaner unit according to claim 7, wherein the upstream opening is provided on a front side of the air cleaner housing in a front direction of the vehicle.

18. The air cleaner unit according to claim 16, wherein the upstream opening is formed over an area facing a front surface of the air cleaner element and a front side of the predetermined space in a front direction of the vehicle.

19. The air cleaner unit according to claim 17, wherein the upstream opening is formed over an area facing a front surface of the air cleaner element and a front side of the predetermined space in a front direction of the vehicle.

20. The air cleaner unit according to claim 9, wherein the air cleaner housing has an upstream opening disposed on a wall of the air cleaner housing, and the upstream opening introduces the intake air to the cleaner upstream space before passing through the air cleaner element.

21. The air cleaner unit according to claim 16, wherein the air cleaner housing has a protruding wall provided on the front side of the air cleaner housing, the upstream opening is defined by a protruding end portion of the protruding wall, and the protruding wall further defines an inside space, the inside space communicates with the predetermined space.

22. The air cleaner unit according to claim 17, wherein the air cleaner housing has a protruding wall provided on the front side of the air cleaner housing, the upstream opening is defined by a protruding end portion of the protruding wall, and the protruding wall further defines an inside space, the inside space communicates with the predetermined space.

23. An air cleaner unit for a vehicle for being arranged generally above a first ring portion of a fan shroud surrounding a first axial flow fan and above a second ring portion of the fan shroud surrounding a second axial flow fan separate from the first axial flow fan, the air cleaner unit comprising:

an air cleaner housing defining an intake passage through which intake air to be introduced to an engine of the vehicle flows, the air cleaner housing having a housing inner space defined by a bottom wall, a plurality of side walls and a cap member;

an air cleaner element disposed within the housing inner space of the air cleaner housing, an open space being defined between the air cleaner element and the bottom wall of the air cleaner housing; wherein the bottom wall of the air cleaner housing includes a first arcuate wall disposed immediately adjacent a portion of the first ring of the fan shroud and a second arcuate wall disposed immediately adjacent a portion of the second ring portion of the fan shroud; and the first arcuate wall and the second arcuate wall increasing a volume of the open space between the air cleaner element and the bottom wall of the air cleaner housing.

* * * * *